Patented Oct. 10, 1922.

1,431,455

UNITED STATES PATENT OFFICE.

HERMAN E. BROWN, OF KINGSTON, NEW YORK, AND JORDAN HOMER STOVER, OF NUTLEY, NEW JERSEY, ASSIGNORS TO SONA CORPORATION, OF NEW YORK, N. Y., A CORPORATION OF NEW YORK.

PLASTIC BINDING AND WATERPROOFING MATERIAL AND PROCESS OF MAKING THE SAME.

No Drawing. Application filed June 24, 1921. Serial No. 480,226.

*To all whom it may concern:*

Be it known that we, HERMAN E. BROWN, a citizen of the United States, residing at Kingston, in the county of Ulster and State of New York, and JORDAN HOMER STOVER, a citizen of the United States, residing at Nutley, in the county of Essex and State of New Jersey, have invented certain new and useful Improvements in Plastic Binding and Waterproofing Material and Process of Making the Same; and we do hereby declare the following to be a full, clear, and exact description of the invention, such as will enable others skilled in the art to which it appertains to make and use the same.

Our invention consists in the novel features hereinafter described, and is fully disclosed in the following description and claims.

The invention has for its object the production of a new composition of matter, suitable for use as a binder in association with non-woven, and other fabrics, for the purpose of consolidating or binding, filling, coating or water-proofing the same, and being especially efficient in the manufacture of non-woven fabrics, and as a substitute for ordinary rubber compounds as a binding and filling material for woven and non-woven fabrics, in the manufacture of imitation leather, wall coverings, linoleum-like materials for floor coverings, table coverings, clothing fabrics, sails, tarpaulins, etc. The articles or fabrics produced by combining our improved binding and water-proofing material with other materials or fabrics are not herein claimed, but are reserved and will form the subject matter of other applications.

Our invention is based upon our discovery that when a solution of cellulose xanthate, and a liquid preparation of natural gums, such as caoutchouc, gutta percha, or recovered gums from manufactured rubber goods dispersed in a suitable dispersing liquid are brought into intimate contact a reaction takes place between them producing a homogeneous material, the cellulose xanthate supplying the necessary sulphur to enable the subsequent vulcanization of the resulting product to be effected by the application of heat, also the two plastics form an intimate mixture having valuable properties.

In carrying out our process for the production of our new binding and waterproofing material, we prefer to proceed as follows:—

A solution of cellulose xanthate containing for example $6\frac{1}{2}\%$ of cellulose is prepared in the usual manner by treating alkali cellulose with carbon bi-sulphide, and dissolving in water. To the solution we prefer to add glycerine to the amount of $6\frac{1}{2}\%$ of the weight of cellulose. The addition of glycerine is not essential, but adds pliability and longer wearing qualities to the finished products.

A mixture of india rubber or caoutchouc, gutta percha, recovered rubber, or the like, is prepared by dispersing the colloidal material in a suitable liquid vehicle, such as benzol, carbon disulfide, turpentine, carbon tetrachloride, solvent naptha, or other well known colloidal dispersing agent. For example, the liquid caoutchouc mixture may be made by dispersing one part of ribbed smoked sheets of caoutchouc in twenty parts of benzol.

The cellulose xanthate solution and the liquid mixture of rubber or other colloidal material are then mixed together in such proportion that the amount of sulphur supplied by the cellulose xanthate solution will be that required to effect the vulcanization of the resulting binding, and water-proofing material to the extent desired in the finished material, it being understood that other elements being the same, a larger proportion of sulphur will result in a harder and denser material and a smaller proportion of sulphur will result in a softer and more flexible product.

As a specific example of a binder embodying our invention and prepared in accordance with our process we mention the following proportions which have been found to give excellent results, Cellulose xanthate solution _____ 1 part.
Liquid india rubber mixture _____ 10 parts.

In combining the cellulose xanthate and liquid rubber mixture, the cellulose xanthate is preferably added, little by little, to the liquid rubber mixture, with vigorous agitation of the latter. The resulting mixture can be employed with great advantages as a binder and water-proofing compound, and subsequently vulcanized, the sulphur in the cellulose xanthate being brought into intimate relation with the rubber so as to form a particularly homogeneous material and facilitating the subsequent vulcanization.

The binding and water-proofing material may be applied to any desired fabric or material in any usual or preferred manner. For example, it may be used in liquid phase and applied to the exterior of fabrics (whether woven or non-woven) or the fabrics may be immersed therein, the treated materials being subsequently allowed to dry to permit the liquid vehicles or dispersing agents to evaporate, and being then preferably washed to remove any compounds soluble in water, then dried and vulcanized at a temperature of 240° F., for example.

In some instances, where it is desirable, the binding and water-proofing material itself may be dried or filter pressed to eliminate the liquid vehicles or dispersing agents, washed with water to remove compounds soluble in water, and applied to, combined with, or incorporated in fabrics or other materials in any desired manner and subsequently vulcanized.

The binding and water-proofing material is highly elastic and tough, and its properties may be greatly varied by varying the proportions of the materials used in producing the same, and the proportions of cellulose xanthate and liquid rubber in the respective liquid mixtures. Taking the cellulose xanthate and liquid rubber mixture prepared as in the examples hereinbefore stated, and combining them for example in equal proportions, a very strong tough binder is obtained, with, however, less elasticity than that produced where the proportions are one of cellulose xanthate to ten of the liquid rubber mixture as in the specific example hereinbefore given.

Not only raw india rubber may be used, but also reclaimed rubber, even that containing large quantities of tar compounds, such as is used for wire insulation and the binder itself may be modified by adding thereto various mineral and non-mineral fillers as may be desired, and the binder may also be combined with organic compounds or various oils, such for example as linseed oil, castor oil, etc. The inorganic fillers which we prefer to employ are for example, magnesium oxide, carbon black, red lead, ferric oxide, and zinc oxide. These fillers give body to the binder and to the resulting fabric with which it may be combined, and also impart color. They may be used separately or in suitable combinations. As examples of organic fillers or bodies which may be advantageously combined with the binding material, per se, may be mentioned gum arabic, glue, sugars, phenols and creosote tars. The effect of gum arabic is that of a moisture repellant. The use of glue in conjunction with the binder imparts increased pliability, and the use of sugars, phenols and creosote tars, tends to prevent dehydration of the rubber. These substances may be used separately or in combination, according to the results to be obtained in the finished product.

We have referred to the liquid material produced by dispersing india rubber or other colloidal material in a liquid vehicle, as a liquid mixture rather than as a "solution," as it is sometimes termed, since as a matter of fact, india rubber and the like colloidal material does not form a true solution in these liquid vehicles.

It is to be understood that we do not limit ourselves to the proportions of the liquid mixtures employed in preparing our improved binder, or to the proportionate strength of the same, as both these proportions may be varied within wide limits to produce the characteristics or quality desired in the resulting fabric, as hereinbefore indicated.

What we claim, and desire to secure by Letters Patent is:—

1. The herein described process of producing a binding and water-proofing material, which consists in combining cellulose xanthate with a natural, vulcanizable gum, the preparation of cellulose xanthate being such as to furnish the necessary amount of sulphur to secure the desired vulcanization of the resulting compound.

2. The herein described process of producing a binding and waterproofing material, which consists in combining a solution of cellulose xanthate with a liquid mixture comprising india rubber dispersed in a dispersing liquid.

3. The herein described process of producing a binding and water-proofing material, which consists in combining a solution of cellulose xanthate with a liquid mixture containing india rubber, the preparation of cellulose xanthate being such as to furnish the necessary amount of sulphur to secure the desired vulcanization of the resulting compound.

4. The herein described process of producing a binding and water-proofing material, which consists in combining a solution of cellulose xanthate with a liquid mixture containing india rubber, separating the liquids by evaporation, washing the resulting material with water to remove matter soluble therein, and drying the material.

5. As a new article of manufacture a binding and water-proofing material comprising a natural vulcanizable gum combined with a sufficient quantity of cellulose xanthate to furnish the necessary amount of sulphur to secure the desired vulcanization of the resulting product.

6. As a new article of manufacture, a binding and water-proofing material, comprising cellulose xanthate combined with india rubber and glycerine.

7. As a new article of manufacture a binding and water-proofing material comprising cellulose xanthate, india rubber and filling material including moisture repelling organic material.

8. As a new article of manufacture, a binding and water-proofing material comprising cellulose xanthate, india rubber and filling material including organic material capable of exercising anti-dehydrating effect upon the rubber.

9. As a new article of manufacture a binding and water-proofing material comprising a natural vulcanizable gum combined with a sufficient quantity of cellulose xanthate to furnish the necessary amount of sulphur to secure the desired vulcanization of the resulting product, and filling material.

10. As a new article of manufacture a binding and water-proofing material comprising a natural vulcanizable gum combined with a sufficient quantity of cellulose xanthate to furnish the necessary amount of sulphur to secure the desired vulcanization of the resulting product, and filling material including inorganic filling material for imparting body and color to the material.

11. As a new article of manufacture a binding and water-proofing material comprising a natural vulcanizable gum combined with a sufficient quantity of cellulose xanthate to furnish the necessary amount of sulphur to secure the desired vulcanization of the resulting product, and filling material including organic and inorganic filling material.

In testimony whereof we affix our signatures.

HERMAN E. BROWN.
JORDAN HOMER STOVER.